April 29, 1969 H. VISSNIA 3,440,871
MAGNETOSTRICTION TRANSDUCER
Filed July 29, 1965 Sheet 1 of 6

INVENTOR
HENRI VISSNIA
BY
*Amirie & Smiley*
ATTORNEYS

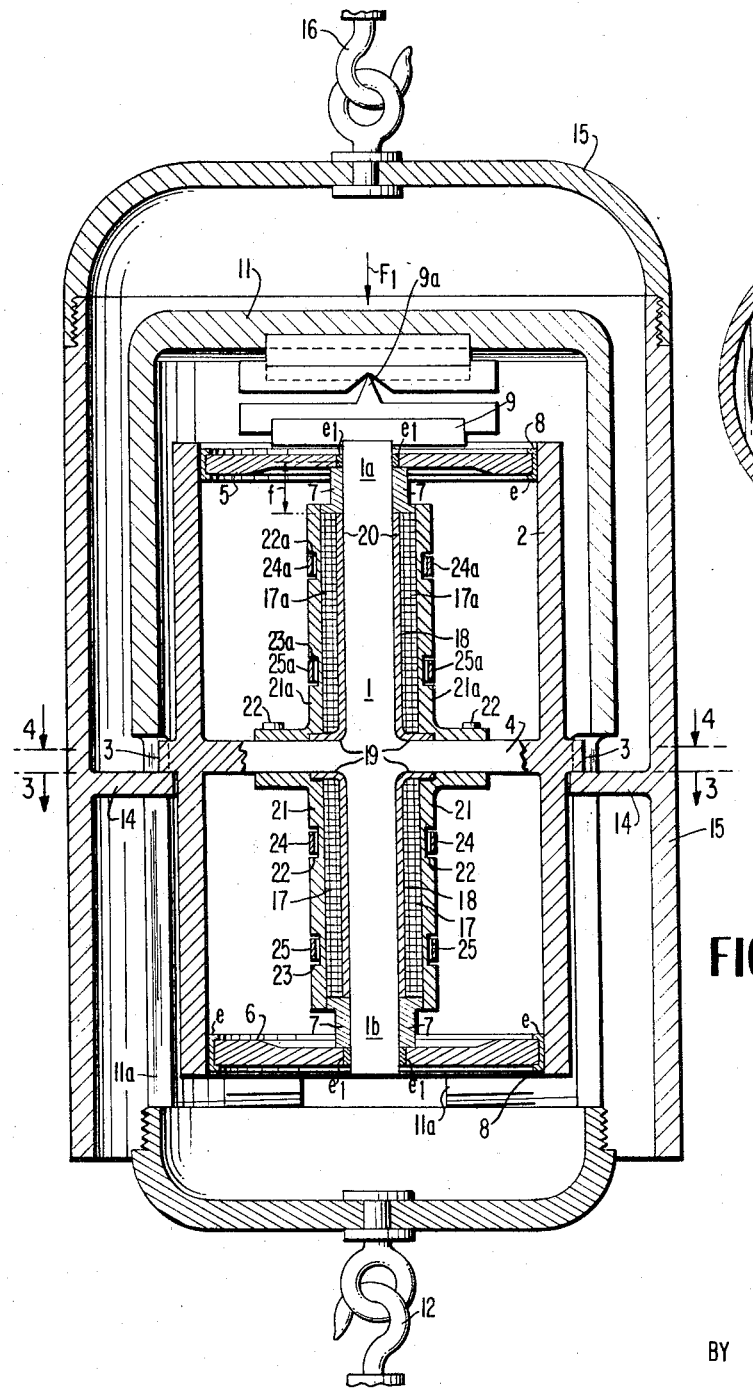
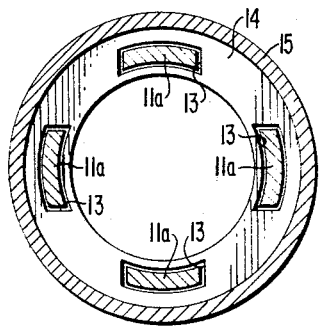
FIG.2
FIG.3

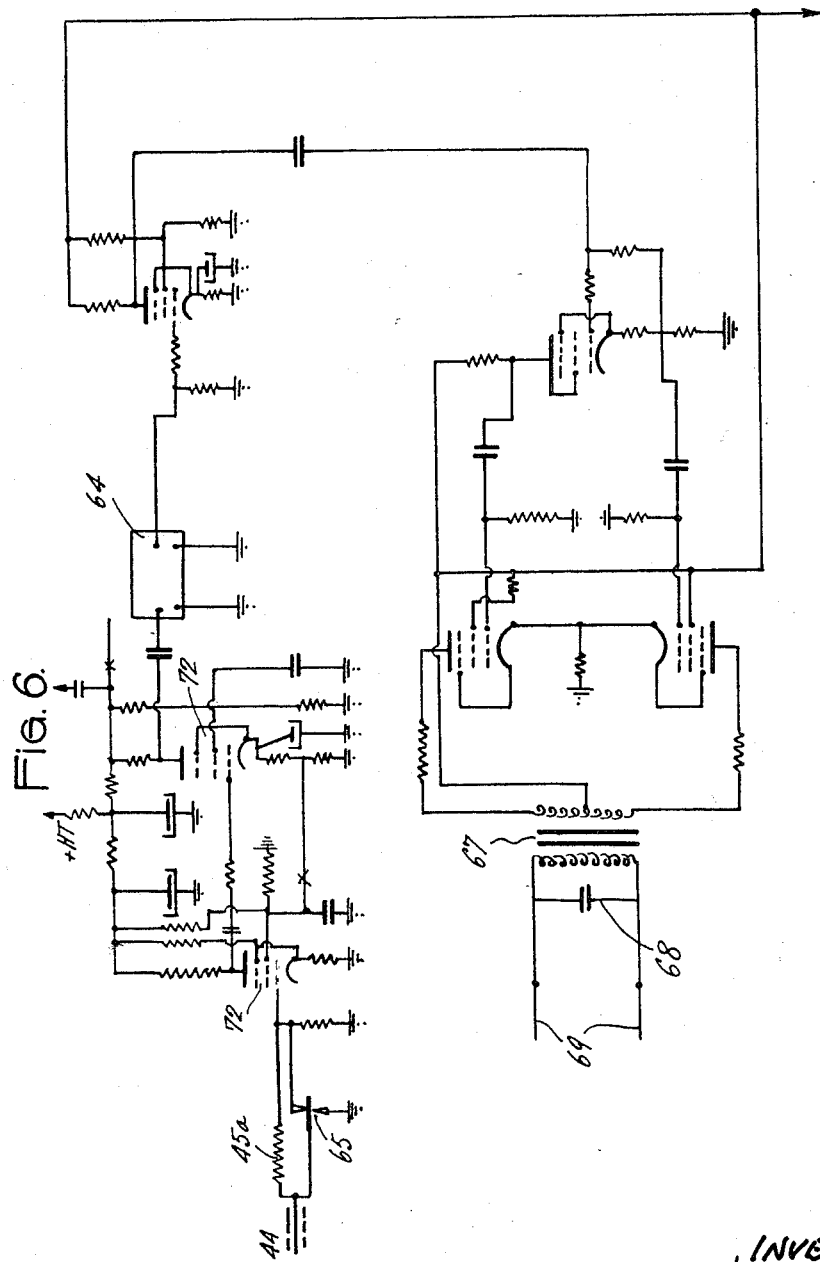

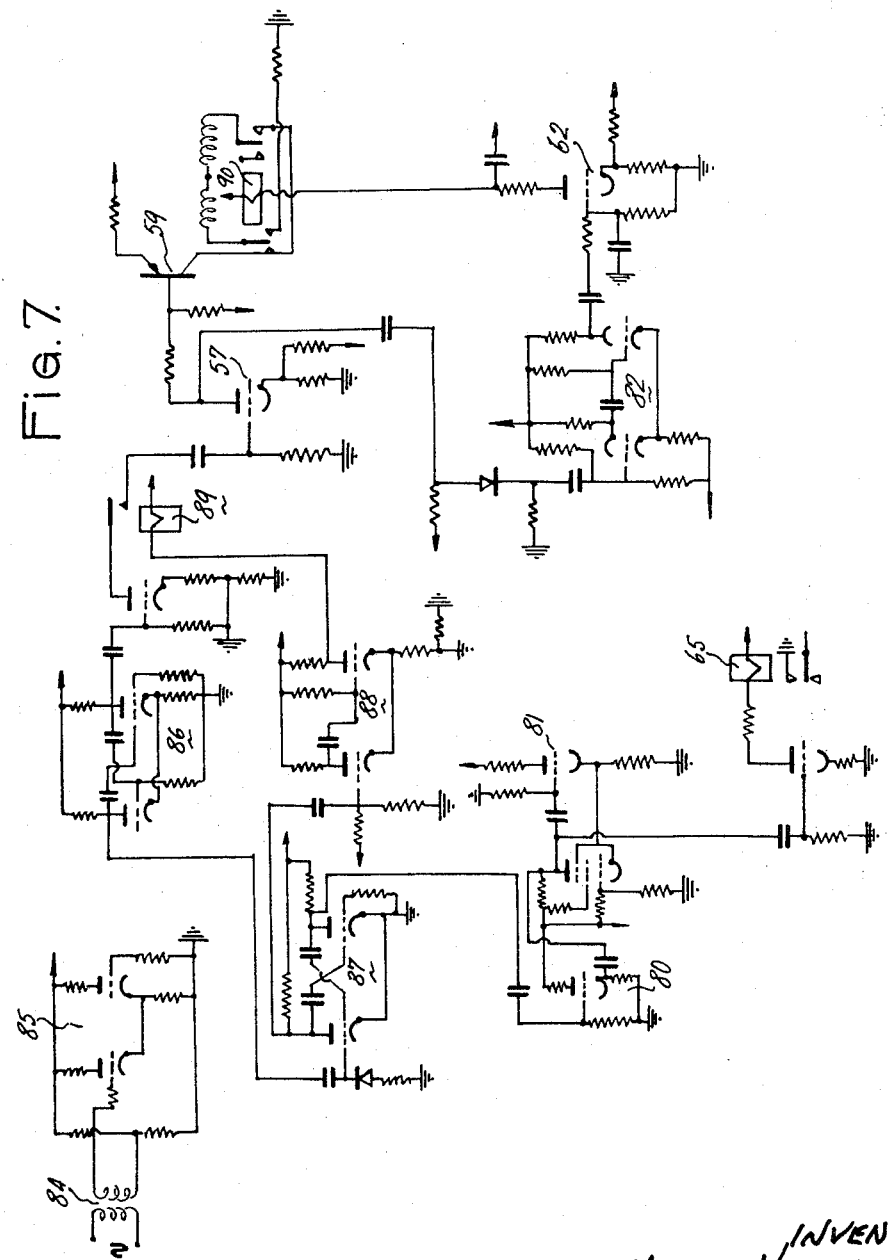

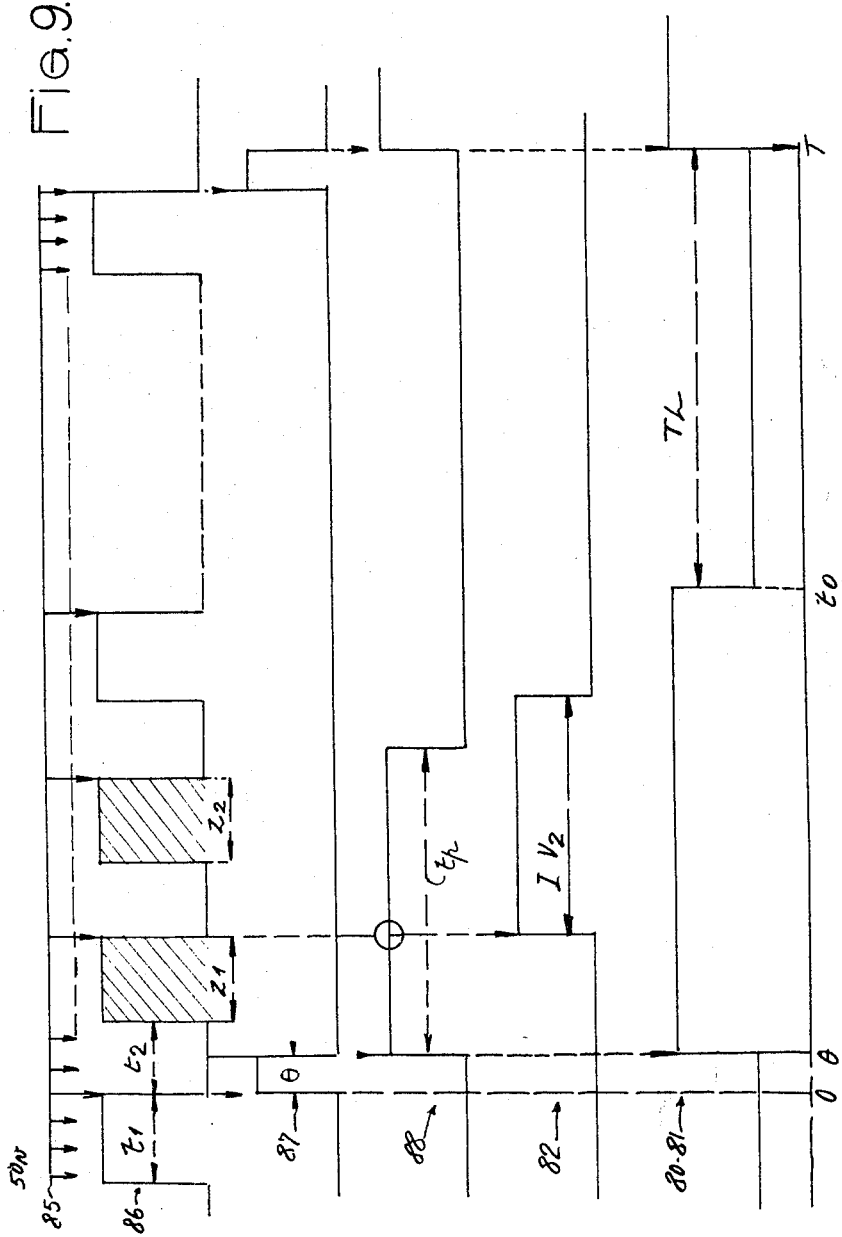

2,440,871
Patented Apr. 29, 1969

3,440,871
MAGNETOSTRICTION TRANSDUCER
Henri Vissnia, 10 Rue Saint-Fargeau,
Paris 20eme, France
Filed July 29, 1965, Ser. No. 475,730
Claims priority, application France, Aug. 5, 1964,
984,290
Int. Cl. G01l 5/12
U.S. Cl. 73—141         5 Claims

ABSTRACT OF THE DISCLOSURE

The change in A.C. permeability of a magnetic member due to an externally applied load is made to reveal itself solely as a function of diffusion of solid solution atoms by periodically relaxing crystalline mesh distortion through the application of a relaxation magnetic field.

BACKGROUND OF THE INVENTION

The well known characteristic of magnetic materials to display variations in A.C. permeability as a result of mechanical stresses applied thereto is the result of two different phenomena. One is due to the change in flux caused by distortion of the crystalline mesh of the magnetic material and the other is due to the change in distribution of the atoms in solution in the domain walls, and both vary in accord with an applied force.

The former effect causes an increase in A.C. permeability for the application of an external force in one direction and a decrease in A.C. permeability for the application of an external force in the opposite direction whereas the latter effect causes a decrease in A.C. permeability regardless of the direction of the externally applied force. The two effects are cumulative and are not colinear and this explains why some material display an inversion of A.C. permeability change above and below some particular loading.

BRIEF SUMMARY OF THE INVENTION

This invention relates to means whereby the former effect is negated so that the change in magnetic A.C. permeability is a function only of the redistribution of the atoms in solution in the domain walls.

The manner in which the stated former effect is negated concerns the utilization of relaxation pulses of opposite polarity to which the gauge assembly is subjected. These relaxation pulses cause diffusion of the carbon atoms (in the case of low carbon steel) in the axial direction and consequent relaxation of the distortion of the crystalline mesh caused by the applied load. When the relaxation pulses are terminated, a stabilizing effect is created, by the remanent H field of external magnetic means forming a magnetic path through the gauge, which favors displacement of the domain walls to produce magnetization in the axial direction of the gauge and blocks domain wall displacement which would produce magnetization deviating from the axial direction. Thus, the stabilizing effect opposes the effect of crystalline mesh distortion. That is to say, stabilization is created by the magnetizing effect of the external magnetic means which affects the measuring gauge such that its change in A.C. permeability due to applied force is a function only of carbon atom diffusion.

Various other characteristics of the invention will moreover be revealed by the detailed description which follows.

A form of the invention is shown, by way of example, in the accompanying drawings.

FIG. 2 is a sectional view of the element of a hook weighing instrument converting mechanical stresses into electric tension.

FIG. 3 is a sectional view along the line 3—3 of FIG. 2.

FIG. 6 is a diagram of the amplifier used in the measuring instrument.

FIG. 7 shows the diagram of a pulse generator and a relay box of the instrument.

FIG. 9 is a diagram showing the continuous cycle of sending pulse and reading time.

Figure 1:
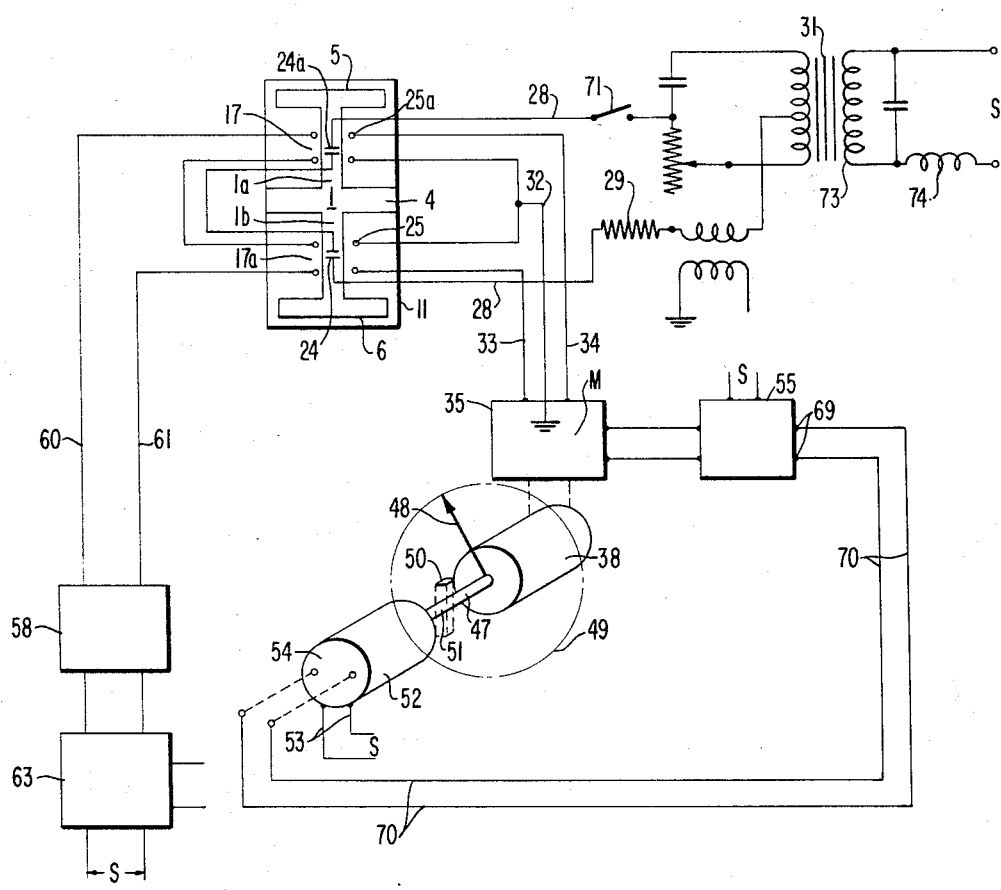
FIG. 1 is a general diagram of the measuring instrument.
Figure 8:
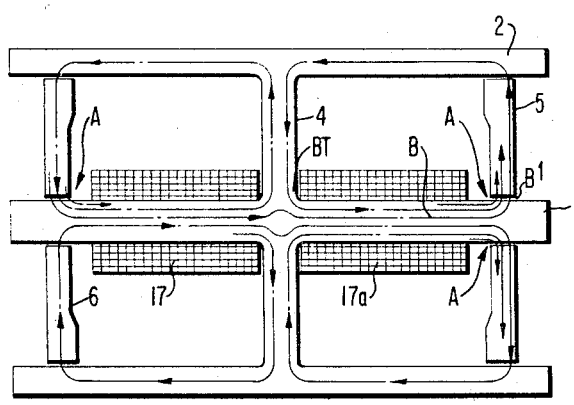
FIG. 8 is a diagram of the weighing element showing the distribution of the induction lines created by the pulse coil.

As shown in FIGS. 1 and 2, the magnetic part of the instrument comprises a bar 1 of magnetic material, integral with a circular plate 4 perpendicular to the longitudinal axis of the bar at the middle thereof and coaxial thereto, and also a surrounding hollow cylinder 2 disposed coaxially with the bar. This structure defines two gauges 1a and 1b, the first serving as a weigh bar undergoing a magnetostriction effect and the second serving as a reference gauge. Bar 1 and cylinder 2 are formed of magnetic material such as soft iron, semi-hard or hard steel or any other magnetic alloy or compound. It can comprise an outer thin copper layer on the external area of cylinder 2 for ensuring a shield effect from stray electric fields and an even distribution of heat exchanges of the two gauges with the ambient medium.

As pointed out, the gauge 1a serves as a force measuring member while gauge 1b serves as a reference member, the force measuring effect being determined in general by comparing the change in magnetic properties of the gauge 1a under the influence of compression forces applied thereto as opposed to the magnetic properties of the unstressed reference gauge 1b.

Discs 5 and 6 can be mounted tightly on the gauges 1a and 1b and are inserted until they are recessed within cylinders 2, being bottomed on the sleeves 7.

The stability of the air gaps e is ensured by a connection between the discs 5 and 6 and the cylinders 2, thus preventing any transversal displacement, while not opposing resistance to slight longitudinal displacements resulting from applying the load. This may be effected by filling the air gap e with a very thin ring 8 of self-lubricating synthetic material such as Teflon.

Figure 4:
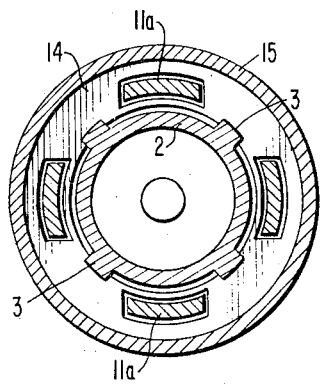
FIG. 4 is a sectional view along the line 4—4 of FIG. 2.

Resting on the upper land of the gauge 1a is a bronze thrust washer 9 having an integral blade or ball 9a on which a part 10 rests which supports the compression stress which can be transmitted by an inner housing 11 having a removable end cap to engage a hook 12 supporting the weight to be measured. The lower part of the housing 11 is cut away to present the depending fingers 11a which straddle and clear the protrusions 3 of the cylinder 2 and which pass through the slots 13 in the internal flange 14 of an outer housing 15. The protrusions 3 rest upon the flange 14 of the outer housing and the outer housing is suspended by a suitable hook 16 so that the weight hung by the hook 12 on the inner housing 11 imposes a compressive force on the gauge 1b, as may be seen more clearly in FIGS. 3 and 4.

Each gauge 1a or 1b is provided with means for receiving a winding assembly, the two winding assemblies being similar and mounted symmetrically with respect to the central disc 4. Sleeves 18 and 18a, of highly insulating synthetic material and with very thin walls, are snugly received on the gauges 1a, 1b and the ends of these sleeves each have a collar 19 adapted to keep the winding assembly properly in position and the opposite ends 20 of the sleeves 18, 18a abut against the sleeves 7 which locate the discs 5, 6. The pulse coils 17, 17a are wound on the sleeves 18 and 18a and extend from the collars 19 to the sleeves 7 so as to be spaced distances $f$ from the respective discs 5, 6. Flanged sleeves 21, 21a, of insulating synthetic material are fixed on the central disc 4 by screws 22, each such sleeve having a pair of circumferential grooves 22, 23 and 22a, 23a, in which the primary windings 24 and 24a and the secondary windings 25 and 25a are disposed. The primary windings may be placed where convenient provide that symmetry of the positions of the windings of the two gauges with respect to the central disc 4 is observed.

Figure 5:
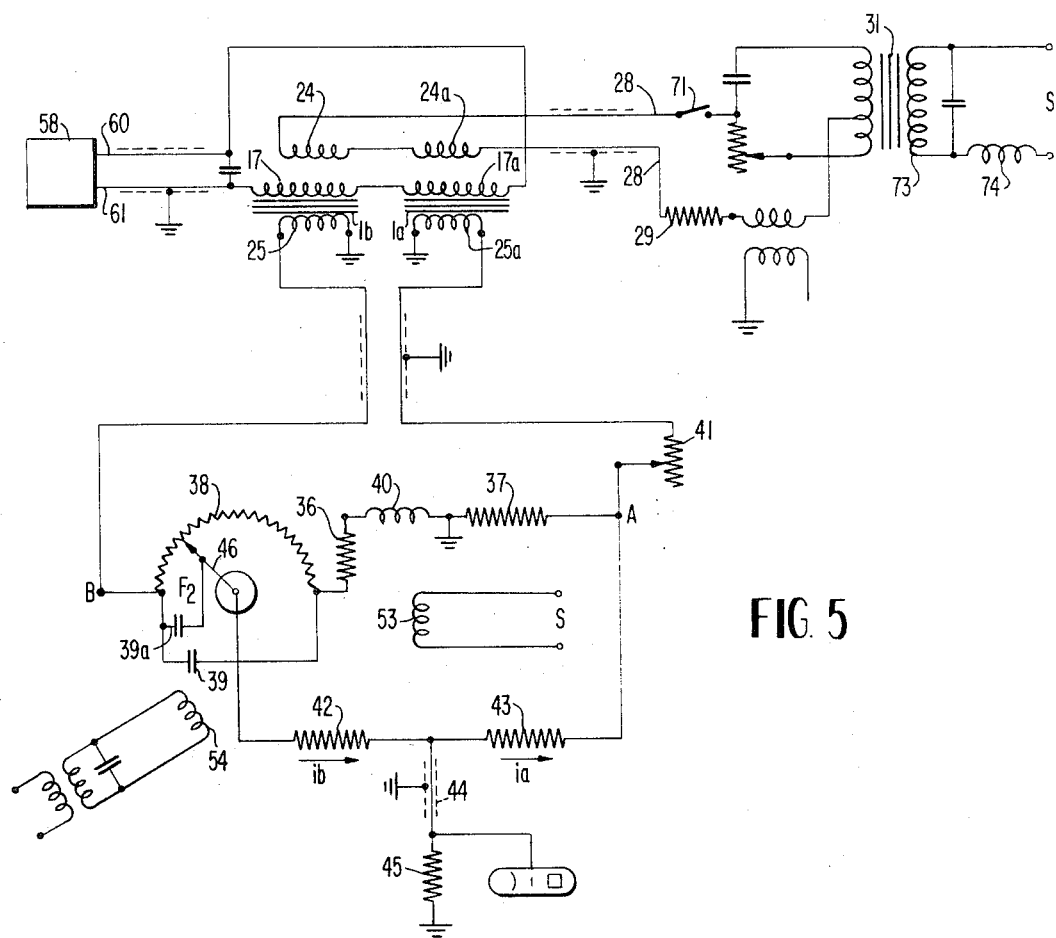
FIG. 5 is a diagram of the electrical part of the weighing instrument.

As shown in FIG. 1 and FIG. 5, the two primary windings 24, 24a are connected in series and are connected by the conductor 28 through a resistance 29, the secondary winding 30 of the transformer 84 to the center tap of the secondary winding of the transformer 31. The transformer 84 supplies the synchronizing device of the pulse generator 58 (FIG. 7).

The two secondary windings 25, 25a are mounted in series and connected by a conductor 32 to an earth M, whereas the other two inputs of these secondary windings are connected by shielded conductors 33, 34 to a double electric bridge 35 (FIG. 5). The first arm of this bridge comprises two resistances 36, 37, a potentiometer 38 of the lowest possible resistance compatible with a very good resolving power and good linearity, these elements all being of the same metal with a low temperature coefficient. A capacitor 39a shunts the potentiometer and a capacitor 39a is connected across the terminal B and the cursor 46 of the potentiometer. The bridge also comprises an inductor 40 and a potentiometer 41 with low resistance value contribution. The resistance 37 has a value equal to the sum of the resistances 36 and the potentiometer 38. The capacitors 39 and 39a and the reactor 40 form a network intended to correct a slight forward phase change of the tension supplied by the secondary winding of the active gauge 1a when high stresses are applied. The second arm of the bridge 35 comprises two resistances 42 and 43 which are identical, of a very high value (at least a thousand times the resistance value of the potentiometer), preferably obtained by a deposit of a metallic film of low temperature coefficient or else by employing stabilized carbon for avoiding variations during the operation. The common point of these two resistances is connected by a short shielded wire 44 at the input 45 of an amplifier described further on.

The assembly of the resistances, inductor and capacitor of the double bridge 35 is provided with suitable shielding. The brush 46 of the potentiometer 38 is mounted on a spindle 47, driving an indicator 48 at one end formed by a needle moving in front of a dial 49. The spindle 47, which if desired may also drive a printing device (not shown), is connected by a suitable mechanical reducing gear and a magnetic brake 50 to the shaft 51 of a servomotor 52 whose fixed phase 53 is fed by the mains S. The control phase 54, after amplifying, receives the voltage taken between the point common to the resistances 42, 43 and the earth on the electric bridge 35.

The windings 17, 17a which are made of several layers of evenly coiled wire, are impregnated and rigidly fixed; they uniformly cover a large part of the surface of the gauges 1a, 1b. These windings 17, 17a, which are similar, are fed in series by the current of a power transistor 59, of the pulse generator 58 shown in FIG. 7. The triode 62 of the generator 58 feeds a relay 90 ensuring the inversion in due time of the direction of the current pulses which are transmitted to the gauges 1a, 1b by two conductors 60, 61 which are properly insulated and shielded. The pulse generator 58 (FIG. 7), which comprises five double triode lamps, three relay control lamps, a pulse amplifier (a lamp and a transistor) receives, through its input transformer, the voltage from the mains through a saturated iron regulator 63 (FIG. 1).

Amplifying is effected by means of an amplifier 55 of which a preferred diagram is given in FIG. 6.

The amplifier 55, shown in FIG. 6 is mounted on a non-magnetic metal frame. The input lamp 72 is an E8OS, mounted as an electrometer, polarized by bridge, heated by reduced direct current to reduce to a minimum the reverse grid current so that the beat of the relay 65 operating by relaxation on very short pulses, earthing its grid, does not give kicks to the servomotor; a resistance 45a, whose ohmic value is half that of the resistance 42, contributes towards this effect. The lamps 72 and 72a are fed by a high tension source HT, are separated and are followed by a harmonic filter 3 of an outphasing lamp attacking a stage of power push-pull and finally an output transformer 67 shunted by the capacitor 68.

The output 69 of the amplifier is connected by conductors 70 to the servomotor 52.

The measuring instrument operates as follows:

The amplifying stages shown in FIG. 6 are energized by means of a switch (not shown) and without the primary windings 24, 24a being fed. The servomotor 52 must not revolve as soon as the amplifying stages are fed. If this motor revolves while thus moving the weight indicator formed by the needle 48, this shows that spurious currents, due to mains inductors flow in the double gauge, if it is badly balanced, or in wires not properly shielded. In the appliance according to the invention, the shielding and symmetry of the two gauges means that the spurious fields can only induce, in the secondary windings, slight equal electromotive forces cancelling themselves out by opposition in the bridge.

By closing the switch 71 (FIG. 5), the primary windings 24, 24a are fed in series with the high resistance 29 either from the mains S, or from an oscillator fed by these mains. The current in these low resistant windings is such that it produces an alternating flux in the gauge which, weakened by the strong demagnetization due to leaks at the ends of the windings, varies linearly with the intensity of this current over a wide range.

The operation of the measuring appliance depends to a certain extent on the stability of the current supplied to the primary which must not vary more than $\frac{1}{200}$ (if a reading stability of $\frac{1}{2000}$ is desired). The saturated iron regulator 63 ensures this stability. A filter 74 placed between the mains S and the primary 73 of the transformer 31 eliminates the harmonics produced by the regulator 63.

As soon as the primary windings 24 and 24a are fed, their alternating fields produce, in each of the gauges, a direct magnetic flux $\phi_0$ and a propagating flux $\phi_1$; the direction of the bonds is such that all the fluxes are turned in the same direction in the two gauges.

The electromotive forces Es induced by the fluxes $\phi_0$ and $\phi_1$ in each of the secondary windings 25, 25a feed the double electric bridge 35 in series. If Es1 and Es2 are equal in amplitude and phase, the linear potentiometer 38 is placed in a position which gives: $R1 = R2 + R_p$, $R2$ being the resistance 36, R1 the resistance 37 and $R_p$ the total resistance of the potentiometer 38. In this position, the brush of the potentiometer is at the zero potential; no voltage is applied to the amplifier, the servomotor 52 is motionless. This condition is achieved if the two components Es1, Es2 are equal in amplitude and phase.

This is obtained by feeding the two primary windings in series, the identity of the forms of the two gauges, their equal magnetic state (assured by employing pulses), the identity of the windings, their quality and their symmetrical position with respect to the central disc 4.

With the primary and secondary windings being correctly fixed on each winding unit and the discs 5 and 6 inserted equally the potentiometer is nearly at zero. The setting of zero is performed by turning the make up potentiometer 41 or very slightly moving the disc 6 of the reference gauge which is only definitely fixed after this adjustment. At the output of the amplifier an undesirable quadrature voltage may exist which is eliminated by setting the inductance 40.

When a force is applied as designated in FIG. 2 by the arrow $F_1$, the gauge $1a$ is compressed along its axis. This axial compression stress causes the variation of the radical reversible permeability of the magnetic metal and hence $\phi_0$ and $\phi_1$; the electromotive force $Es1$ is diminished or increased according to whether this metal is a positive or negative magnetostriction. The bridge is then unbalanced, a slight electromotive force $u$ at 50 periods appears at the input of the amplifier whose output supplies to the poles 54 of the servomotor an electromotive force dephased by 90° on that of the poles 53, forward or backward according as to whether the force $F_1$ increases or decreases. The servomotor 52 revolves, driving the cursor of the potentiometer and the needle of the dial, up to the position for which $u$ cancels out and on which it stops after a slight oscillation damped by the magnetic brake 50 above described. This position defines the value of $F_1$. In the appliance of the invention, we obtain a perfect stability of zero and readings by providing, during short moments, very strong equal longitudinal fields and of the same direction in both gauges, produced by trains of two pulses of inverse directions, measurement taking place in the absence of these trains, with weak alternating fields.

Linearity is obtained by using the external magnetic means 4, 5, 6 and 2 to produce a remanent field $Hr$ which acts as a stabilizing force on the gauge $1a$ during the measuring period between pulses.

The longitudinal fields are created and suppressed simultaneously by the windings 17 and 17a fed by pulses of several hundreds of milliseconds received from the pulse generator 58 shown in FIG. 7. The amplitude and duration time of pulses must enable the almost complete disappearance of the domain walls of the gauges and ensure the relaxing of atoms in interstitial solution (carbon in ferrite) or in substitutional solution (iron-nickel, iron-silicon alloys). FIG. 9 shows the continuous cycle of this generator. In the $e$ time, the relay 65 cuts out the input of the amplifier which it will close in $to$ time under the control of the flip-flop 88; at the same time $e$, the flip-flop 88 acts on the relay 89 during the $tp$ necessary for the passage of the two pulses.

The end of the first pulse starts up the flip-flop 82 which acts on the inversion relay 90 until after the end of the second pulse.

The multivibrator 87 controls the time T of the cycle which is nearly of one second. It is synchronized by the multivibrator 86 giving the time $t_1$ of the pulses and the interval $t_2$ between the two pulses.

The multivibrator 86 is itself synchronized by the square pulses at 50 periods $Z_1$, $Z_2$ delivered by the lamp 85 controlled by the 50-period current that it receives from the small transformer 84.

In FIG. 9, $IV_2$ shows the passage of the second inverted pulse, whereas TL gives the reading time.

The voltage of these lamps are uncoupled from one another and stabilized by neon tubes (not shown in FIG. 7).

It is possible to reduce the duration of the cycle by utilizing hollow gauges $1a$ and $1b$ or carrying several thin radial notches turned according to the axis, which, by eliminating the lagging effects of eddy currents, enables the width of the pulses to be diminished.

The strong magnetization communciated to the gauges in the region of the pulse coils, entails, by means of peripheric electrons, the displacement of magnetic energy towards the discs 4, 5 and 6 and cylinder 2, necessary for the rapid relaxation of the mean magnetization disparities between the various regions. On the scale of the domains, the walls jump over all the potential barriers (Neel's opposition) carrying along the atoms in solution, to occupy sites parallel to the uniform magnetization taken on in the domain, whatever may be stresses or force fields the dislocation sites being distinctly the most favorized. If, at this moment the metal of the gauges is subjected to mechanical forces their relaxation takes place rapidly in the disturbed regions accentuating or diminishing the diffusion according to whether a traction or compression is exerted in the magnetization direction.

This description of the effect of forces on the diffusion of carbon atoms in interstitial solution in the iron can be extended to the diffusion of atoms in substitution solution in magnetic iron-nickel, iron-silicon, etc., alloys.

On suppressing the pulse field, the domains of the regions of the gauges subjected to this field tend to deviate the direction of their magnetization from the axial direction to assume a state of the most probable assembly of the greatest diversity as influenced by the applied force; but the other regions magnetized (discs 4, 5 6 cylinder 2) oppose this, exerting a stabilizing effect on the gauge that may be likened to the effect of an axial $Hr$ equivalent field, positive when it has the direction of the pulse field.

This stabilization effect favors the displacement of the walls at 90° in the C domains for which magnetization tends to approach the axial direction, whereas it blocks the walls at 90° of the A domains whose magnetization would tend to deviate from this direction. When the field $Hr$ has a suitable value, all the C walls are unblocked and all the A walls are blocked over a wide load range; it is on this condition that the A.C. measuring current will indicate variations linearly proportional to loads.

In irons, steels and alloys containing 0.05 to 0.1% of carbon or nitrogen in solid solution, linearity is obtained when, in the gauge, there are only magnetization lines parallel to the axis and that there are only stresses directed according to the axis (which is ensured by the mechanical mounting and the absence of a torsional component).

The results obtained show that the rate thus becomes linear with the slightest load and that the curves are absolutely reproducible and are linear to within about $\frac{1}{1000}$ in a load interval that can be widened by controlling the carbon content. A carbon content in the region of 0.01% gives a good linearity between 0 and 10 kg./mm. with a permeability variation of 20%, the linearity deviation remaining less than $\frac{1}{1000}$. To ensure the stability of the carbon content in solution, nickel-chrome steels would be used. This content depends on the cooling after annealing. The gauges will be annealed after roughing at a diameter exceeding that of the final diameter, this to prevent the diffusing of the carbon towards the center, when cooling, the surface area, which is the active part, losing its atoms in solution. The maximum content is obtained by a somewhat rapid cooling below 700°.

The stability of readings necessitates the primary current being stabilized at $\frac{1}{200}$, that the end of the second pulse be synchronized and that the current pulses which require a mean stability, be saturating. The symmetry of form of all the elements of the two gauges ensures the stability of the appliance; the discs 5 and 6 must be slightly pushed in flush in the cylinder 2 to prevent slight displacements of the needle between two pulse trains. The air gap $e$ in the region of some $\frac{1}{100}$ths of a mm. must not undergo any mechanical or magnetic distortion.

In these conditions, the value $Hr$ at the remanence is well defined by construction. To set its value with accuracy and eventually adjust the rate, the two windings 17, 17a receive a weak direct current adjustable by the potentiometer 41a (FIG. 6) of rather high resistance and switchable, its direction being magnetizing or demagnetizing. This current will be determined during tests of the appliance so as to obtain linearity throughout the weight range; this setting is not very difficult, which also allows adjustment with this potentiometer of the displacement ratio of the weight-needle.

To prevent remanence variations that may produce false currents at the moment when the appliance is started up or stopped, a device for cutting out or establishing the pulse circuit comprising three relays 81 ensures that the last pulse before cutting out or that the first pulse after putting under voltage shall always have a well-defined direction.

In the foregoing, it has been a question especially of utilizing the measuring instrument as a weighing instrument, but it can also be utilized for measuring other forces.

In the case of utilization as a pair of scales or a weighing machine, the rotation of the shaft 47 can be utilized for controlling devices for the remote transmission of data.

Furthermore, this instrument, on account of its complete reversibility, enables continuous measurements to be made without being obliged to return to the original zero.

Various modifications can also be applied to the form of embodiment shown and described in detail, without going outside of the scope of the invention. In particular, a gauge can be subjected to a torsion stress, but then it must receive pulses from the transversal field, the measuring field being longitudinal. A combination of transversal field and longitudinal field pulses can also be utilized in the appliance described.

I claim:

1. In a magnetostrictive force measuring device,
   a magnetic member which is a solid solution of elements,
   means for applying an external force to said magnetic member whereby its permeability is altered both by crystalline mesh distortion and diffusion of the atoms of one of said elements in solid solution,
   magnetic means forming an essentially closed magnetic path through said magnetic member,
   relaxation means including a winding around said magnetic member and pulse generator means for applying a train of pulse pairs of opposite polarity to said winding whereby said crystalline mesh distortion is relaxed at the expense of further diffusion of said atoms and a remanent field is induced in said magnetic means,
   said solid solution being of such composition that the further diffused state of said atoms is stabilized by said remanent field at the expense of reestablishment of crystalline mesh distortion,
   and means for measuring the permeability of said magnetic member in the intervals between successive pulse pairs to indicate a permeability value which essentially is only a function of said further diffused state of said atoms.

2. In the magnetostrictive force measuring device according to claim 1 wherein said magnetic member is a cylindrical bar, the last mentioned means comprising a cylindrical reference bar coaxial with said magnetic member and which is not subjected to magnetostriction effect, primary and secondary windings on each of said bars, means for inducing alternating induction signals in said bars, and means connected to said secondary windings for measuring the permeability of said magnetic member.

3. A magnetostrictive force measuring device comprising, in combination,
   a pair of integral and coaxial magnetic members,
   means mounting said members for subjecting one only thereof to a magnetostrictive force, while the other member serves as a reference,
   winding means on each of said bars,
   measuring signal means for applying a low alternating field to said winding means,
   measuring means connected to said winding means for measuring the difference in signals induced by said measuring signal means in said members,
   relaxation means connected to said winding means for applying to said members successively in opposite directions a substantially saturating relaxation field,
   and means for connecting said measuring means to said winding means after termination of the application of said relaxation field.

4. In a magnetostrictive force measuring device,
   first and second magnetic members disposed in integral coaxial relation,
   a plate integral with said members and projecting radially thereof at their juncture,
   a cylinder integral with said plate and substantially enclosing said members,
   and plates slidably received in the opposite ends of said cylinder and embracing the free ends of said members,
   a relaxation pulse winding on each member,
   primary and secondary windings on each member,
   measuring signal means for applying a low alternating field to said primary windings,
   measuring means for measuring the difference in signals induced in said secondary windings by said measuring signal means,
   pulse generator means for applying to said relaxation pulse windings successively in opposite directions a substantially saturating relaxation field, and means for connecting said measuring means to said secondary windings after termination of the application of said relaxation field.

5. The device according to claim 4 wherein said relaxation pulse windings extend along the lengths of said members to terminate short of the free ends thereof by an amount greater than the diameter of said members.

References Cited

UNITED STATES PATENTS

| 1,586,877 | 6/1926 | Buckley. | |
| 2,571,718 | 10/1951 | Howes | 73—88.5 XR |
| 2,749,746 | 6/1956 | Wright | 73—88.5 |
| 2,930,227 | 3/1960 | Spademan et al. | 73—141 |
| 3,307,405 | 3/1967 | Stucki | 73—398 |

FOREIGN PATENTS

| 865,051 | 4/1961 | Great Britain. |

RICHARD C. QUEISSER, *Primary Examiner.*

CHARLES A. RUEHL, *Assistant Examiner.*